(12) United States Patent
Klahm et al.

(10) Patent No.: US 12,554,775 B2
(45) Date of Patent: Feb. 17, 2026

(54) WEB BASED COLOUR QUALITY CONTROL

(71) Applicant: BASF Coatings GmbH, Münster (DE)

(72) Inventors: Sebastian Klahm, Muenster (DE); Christoph Schulte, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 385 days.

(21) Appl. No.: 17/312,071

(22) PCT Filed: Dec. 8, 2020

(86) PCT No.: PCT/EP2020/085073
§ 371 (c)(1),
(2) Date: Jun. 9, 2021

(87) PCT Pub. No.: WO2021/130012
PCT Pub. Date: Jul. 1, 2021

(65) Prior Publication Data
US 2022/0365971 A1    Nov. 17, 2022

(30) Foreign Application Priority Data

Dec. 27, 2019  (EP) .................................. 19219819

(51) Int. Cl.
*G06F 16/00* (2019.01)
*G06F 3/048* (2013.01)
(Continued)

(52) U.S. Cl.
CPC ............ *G06F 16/906* (2019.01); *G06F 3/048* (2013.01); *G06F 16/904* (2019.01)

(58) Field of Classification Search
CPC .............................. G06F 16/906; G06F 16/904
See application file for complete search history.

(56) References Cited

U.S. PATENT DOCUMENTS 6,493,084 B1 * 12/2002  Friend ...................... G01J 3/50
                                                          356/402
6,590,648 B1   7/2003  Von Orelli et al.
(Continued)

FOREIGN PATENT DOCUMENTS

| JP | 2001056251 A | 2/2001 |
| JP | 2007531884 A | 11/2007 |
| JP | 2017538960 A | 12/2017 |

OTHER PUBLICATIONS

International Search Report and Written Opinion for corresponding PCT/EP2020/085073 mailed Mar. 4, 2021, 12 Pages.
(Continued)

*Primary Examiner* — Khanh B Pham
(74) *Attorney, Agent, or Firm* — Armstrong Teasdale LLP

(57) ABSTRACT

In order to improve colour quality control of paint coatings, described herein is a colour quality control server that is configured to provide a software distribution model, i.e. Software as a Service (SaaS). With the colour quality control server, the capability provided to a user is to use a collection of (web-)services which are responsible for web-based colour quality control running on a cloud infrastructure. These (web-)services are accessible from various client devices through a thin client interface such as a web browser, a mobile app, or a desktop app.

12 Claims, 5 Drawing Sheets

(51) Int. Cl.
*G06F 16/904* (2019.01)
*G06F 16/906* (2019.01)

(56) References Cited

U.S. PATENT DOCUMENTS

| | | | |
|---|---|---|---|
| 6,772,151 B1* | 8/2004 | Johnston | G01J 3/46 428/407 |
| 8,013,602 B2 | 9/2011 | Otvos et al. | |
| 10,338,863 B1 | 7/2019 | Wang et al. | |
| 10,489,311 B1 | 11/2019 | Vajravel | |
| 10,693,865 B2 | 6/2020 | Manza et al. | |
| 2007/0018906 A1 | 1/2007 | Visnovsky | |
| 2009/0299905 A1 | 12/2009 | Mestha et al. | |
| 2013/0141725 A1 | 6/2013 | Yun | |
| 2015/0116346 A1 | 4/2015 | Somerville et al. | |
| 2016/0123886 A1 | 5/2016 | Jaffe et al. | |
| 2020/0103284 A1* | 4/2020 | Park | G01J 3/0272 |
| 2020/0195637 A1* | 6/2020 | Sato | H04W 12/069 |
| 2022/0291131 A1* | 9/2022 | Heron | A61B 5/14507 |

OTHER PUBLICATIONS

"Let's control Arduino from JavaScript in the browser using WebUSB!", May 2, 2019, available at <https://qiita.com/n0bisuke/items/b5a90ead155097dce484>.

"Create an API that allows Google engineers to connect USB devices directly to the web", Apr. 14, 2016, available at <https://gigazine.net/news/20160414-webusb-api/>.

Jeong Hee-yong, "API that directly connects USB devices and the web," TechHolic, Apr. 15, 2016.

Cai et al., "A Color Management Solution for Mobile Terminal Based on ICC Mechanism", Applied Mechanics and Materials, vol. 731, pp. 37-42 (2015).

* cited by examiner

WEB BASED COLOUR QUALITY CONTROL

CROSS-REFERENCE TO RELATED APPLICATIONS

This application is a U.S. National Phase Application of International Patent Application No. PCT/EP2020/085073, filed Dec. 8, 2020, which claims priority to European Patent Application No. 19219819.0, filed Dec. 27, 2019, the entire contents of which are hereby incorporated by reference herein.

FIELD OF THE INVENTION

The present invention relates to colour quality control. In particular, the present invention relates to a colour quality control server, to a colour quality control system, to a colour quality control method, and to a computer program element.

BACKGROUND OF THE INVENTION

The appearance of the coating quality requirements of e.g. paint coatings on car bodies, include the colour of the coating. Colorimeters, spectrophotometers, and other special instruments are used to measure the standard colour and the colour of the test model, and automatically calculates the outstanding difference. However, the usage of any measurement device may require a separate installation of drivers to enable the usage of the measurement device. In addition, data may be stored for classification locally. Any changes may be shared via separate file transfer.

SUMMARY OF THE INVENTION

There may be a need to improve colour quality control of coatings.

The object of the present invention is solved by the subject-matter of the independent claims, wherein further embodiments are incorporated in the dependent claims. It should be noted that the following described aspects of the invention apply also for the colour quality control server, the colour quality control system, the colour quality control method, and the computer program element.

According to a first aspect of the present invention, there is provided a colour quality control server. The colour quality control server comprises a web server unit and a service-providing unit with a calculation sub-unit. The web server unit is configured to interface with a user via a webpage and/or an application program served by the web server unit, and to provide a graphical user interface (GUI) to a user by the webpage and/or the application program such that the user can provide colour measurement data, via the webpage and/or the application program, to the service-providing unit. The calculation sub-unit is configured to compare the colour measurement data to colour reference data to classify the colour measurement data, and to output a result of the comparison via the GUI. The service-providing unit further comprises a data measurement sub-unit configured to allow the user to access and to trigger, via the webpage and/or the application program, a colour measurement device to perform a colour measurement. The colour measurement device is a Universal Serial Bus (USB) device. The colour quality control server is configured to interact with the USB device with a WebUSB application programming interface (API).

In other words, the colour quality control server is configured to provide a software distribution model, i.e. Software as a Service (SaaS). With the colour quality control server, the capability provided to the user is to use a collection of (web-)services which are responsible for web-based colour quality control running e.g. on a cloud infrastructure. These (web-)services are accessible from various client devices through a thin client interface such as a web browser, a mobile app, or a desktop app. The user does not manage or control the underlying cloud infrastructure including network, servers, operating systems, storage, or even individual application capabilities, with the possible exception of limited user-specific application configuration settings.

Thus, the user does not need to fulfil any requirements but have a web browser installed. In an example, the user may use the web browser to use the application and optionally to perform measurements. In an example, the user may install a client on the user's device that instructs the measurement device to follow a workflow to perform the measurement.

The USB is the de-facto standard for wired peripherals. Most USB devices implement one of roughly a dozen standard "device classes" which specify a way for the device to advertise the features it supports and commands and data formats for using those features. Operating systems support such devices using the "class driver" provided by the OS vendor. There is however a long tail of devices that do not fit into one of the standardized device classes.

WebUSB is a solution available in the browser (e.g. Google Chrome) that does not have to be installed or loaded. Only the communication protocol with the device is required to be downloaded and used. WebUSB may be used on any device running e.g. Google Chrome or a Chromium-based browser such as MS Edge. WebUSB allows to be independent from the operating system and therefore may be available in various systems, such as Android, Chrome OS, Linux, macOS and Windows. The WebUSB API provides a way to safely expose USB device services to the web. It is thus possible to carry out a colour measurement with an external colour measurement device connected to a mobile device, which may include any type of wireless device such as consumer electronics devices, smart phones, tablet personal computers, wearable computing devices, personal digital assistants (PDAs), laptop computers, and/or any other like physical computing device that is able to connect to a communications network. This may be beneficial for the colour quality control, because WebUSB provides a generic way to expose any USB device to the web browser and hence it is possible to use this to forward USB commands (e.g., from the calculation sub-unit) to the measurement device(s).

As will discussed hereafter and particularly with respect to the exemplary embodiment shown in FIG. 1, the GUI may use an Angular code base. A product, e.g., typescript code, obtained from the Angular code base is executable within a browser and hence visualizable on every device providing a browser. The user may directly access custom cloud storage for data storage and sharing. The business logic may be available via a representational state transfer (RESTful) web service, which is also addressable by a robotic application directly. The measurement devices may either be used by a local service, which communicates with the GUI, or directly be addressed from the browser without any additional requirements on a local installation. FIG. 4 illustrates an exemplary GUI. FIG. 5 illustrates an exemplary method for obtaining a customizable GUI.

The web server unit may be a server that provides a web service to facilitate management of the services of the colour quality control server by a user of the system. The web server unit may include one or more elements, processes and/or devices. Further, web server unit and the service-providing unit may be implemented by hardware, software, firmware and/or any combination of hardware, software and/or firmware. Thus, for example, any of the web server unit and the service-providing unit could be implemented by one or more analogue or digital circuit(s), logic circuits, programmable processor(s), application specific integrated circuit(s) (ASIC(s)), programmable logic device(s) (PLD(s)) and/or field programmable logic device(s) (FPLD(s)).

In an example, the web server unit and the service-providing unit may be implemented in the same machine.

In an example, the web server unit and the service-providing unit may be distribution of local installation.

In an example, the application program may comprise desktop apps and/or mobile apps.

According to an embodiment of the present invention, the web server unit is further configured to interface with the user via the webpage and/or the application program to allow the user to define a tolerance level for classifying the colour measurement data.

According to an embodiment of the present invention, the service-providing unit further comprises a device configuration sub-unit configured to access a configuration database that stores configuration data of one or more colour measurement devices. The device configuration sub-unit is further configured to provide the configuration data to at least one colour measurement device selected by the user for performing colour measurement.

For example, the measurement device may include e.g., colorimeter, spectrophotometer, and other special instruments. For example, the measurement device may include a robot-controlled measurement device.

Accordingly, the usage of these measurement devices does not require a separate installation of drives to enable the usage of the device. Changing the device types does not require new drivers to be installed. Instead, the measurement device may either be used by a local service which communicates with the GUI or directly be address from the browser without any additional requirements on a local installation.

According to an embodiment of the present invention, the service-providing unit further comprises a reference data interface configured to access a reference database that stores the colour reference data for providing the colour reference data to the calculation sub-unit.

The colour reference data provides standard colour for being compared with the colour of the test model.

The reference database may be stored in a secure and decentralized manner. By granting access from any device, it is guaranteed that identical standards are applied to data independent of the user's environment.

According to an embodiment of the present invention, the service-providing unit further comprises a measurement data interface configured to access a measurement database that stores the colour measurement data for providing the colour measurement data to the calculation sub-unit.

According to an embodiment of the present invention, the colour quality control server further comprises a data storage configured to store at least one reference of an entry in the configuration database, in the measurement database, and in the reference database per user.

In other words, data may be stored for each user separately. I.e. each user may use a different configuration, different measurement, and different references all stored in the corresponding central databases.

According to an embodiment of the present invention, the GUI has an Angular code base whose product is executable within a web browser.

According to an embodiment of the present invention, the service-providing unit further comprises an authentication sub-unit configured to be an interface through which the user can authenticate to access a user-requested service.

According to a second aspect of the present invention, there is provided a colour quality control system. The colour quality control system comprises a colour measurement device, a client device, and a colour quality control server according to the first aspect and any associated example. The colour measurement device is configured to perform colour measurement. The client device is configured to communicate with the colour quality control server to provide a graphical user interface (GUI) to a user by a webpage and/or an application program served by the colour quality control server such that the user can classify the colour measurement data via the webpage and/or the application program.

In an example, the colour quality control server may be implemented in a client device, such as a personal computer.

In an example, the colour quality control server and the client device may communicate with each other, via a network. In some examples, the network may be the internet. Alternatively, the network may be any other type and number of networks. For example, the network may be implemented by several local area networks connected to a wide area network. Of course, any other configuration and topology may be utilized to implement the network, including any combination of wired network, wireless networks, wide area networks, local area networks, etc.

In an example, the colour quality control system may be implemented on cloud computing.

According to an embodiment of the present invention, the colour quality controls system further comprises a cloud storage configured to store at least one of the configuration database, the measurement database, and the reference database.

Accordingly, instead of sharing data via file transfer, the user may directly access custom cloud storage for data storage and sharing.

According to a third aspect of the present invention, there is provided a colour quality control method. The colour quality control method comprises:
  a) providing, via a graphical user interface (GUI), provided by a webpage and/or an application program on a client device, colour measurement data to a colour quality control server according to any one of the preceding claims;
  b) comparing, by the colour quality control server, the colour measurement data to colour reference data to classify the colour measurement data; and
  c) providing, by the colour quality control server, a result of the comparison via the GUI to a user,
    wherein the client device is connectable to a colour measurement device, which is accessed and triggered, via the webpage and/or the application program, for obtaining the colour measurement data, said colour measurement device being a USB device; and
    wherein the colour quality control server interacts with the USB device with a WebUSB application programming interface, API.

The WebUSB interface provided by the web browser or the application program is used to control the colour measurement devices. With the WebUSB interface, it is possible to carry out a colour measurement with an external measuring device without prior installation or downloading of a "local module" required to control the measuring device and final assessment of the measured sample with a view to colour differences. Additionally, WebUSB is a solution available in the browser (e.g. Google Chrome, Firefox, or Opera) that does not have to be installed or loaded additionally. Only the communication protocol with the device is required to be downloaded and used. Further, as WebUSB is a solution available in the browser, WebUSB may be used independent of operating systems.

The client device may be a mobile device. The term "mobile device" may include any type of wireless device such as consumer electronics devices, smart phones, tablet personal computers, wearable computing devices, personal digital assistants (PDAs), laptop computers, and/or any other like physical computing device that is able to connect to a communications network.

The WebUSB interface provided by the web browser or the application program on the mobile device may be used to control the colour measurement devices for performing colour measurements. Thanks to the mobile measurement, the assessment and classification of the measured sample may be accessed directly—even from a remote location. It is not necessary to firstly download the measurement to a Windows-based device.

According to an embodiment of the present invention, step a) further comprises the step of interfacing with the client device via the webpage and/or the application program by the web server unit to allow a user to access a colour measurement device and to trigger, via the webpage and/or the application program, the colour measurement device to perform colour measurement.

According to another aspect of the present invention, there is provided a computer program product comprising a computer program with program code for performing a method according to the third aspect and any associated example.

As used herein, the term "unit" or "sub-unit" may be a software, or hardware dedicated to running said software, for delivering the corresponding functionality or service. Each unit or sub-unit may be part of, or include an ASIC, an electronic circuit, a processor (shared, dedicated, or group) and/or memory (shared, dedicated, or group) that execute one or more software or firmware programs, a combinational logical circuit, and/or other suitable components that provide the described functionality.

These and other aspects of the present invention will become apparent from and be elucidated with reference to the embodiments described hereinafter.

BRIEF DESCRIPTION OF THE DRAWINGS

These and other aspects of the invention will be apparent from and elucidated further with reference to the embodiments described by way of examples in the following description and with reference to the accompanying drawings, in which FIG. 1 schematically shows a colour quality control system according to some embodiments of the present disclosure.

Figure 1:
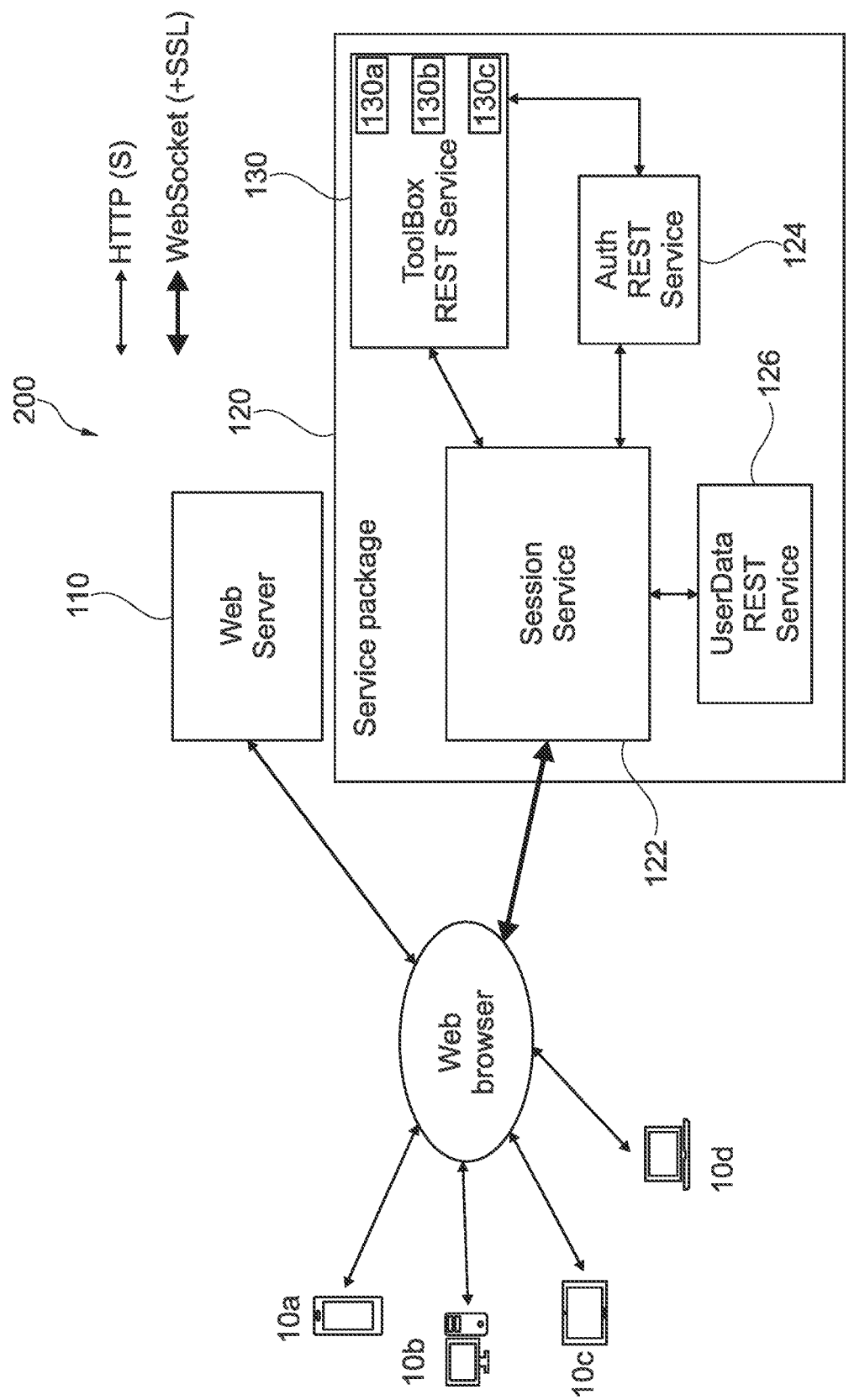

It should be noted that the figures are purely diagrammatic and not drawn to scale. In the figures, elements which correspond to elements already described may have the same reference numerals. Examples, embodiments or optional features, whether indicated as non-limiting or not, are not to be understood as limiting the invention as claimed.

DETAILED DESCRIPTION OF EMBODIMENTS

FIG. 1 schematically shows a colour quality control system 200 according to some embodiments of the present disclosure. The colour quality control system 200 comprises a colour quality control server 100. The colour quality control server 100 comprises a web server unit 110 and a service-providing unit 120 with a calculation sub-unit 130a.

The web server unit 110 is configured to interface with a user via a webpage and/or an application program served by the web server unit 110, and to provide a graphical user interface (GUI) to a user by the webpage and/or the application program such that the user can provide colour measurement data, via the webpage and/or the application program, to the service-providing unit 120.

The web server unit 110 may be a server software, or hardware dedicated to running said software, that can satisfy World Wide Web client requests. The web server may process incoming network requests over HTTP and several other related protocols for communication between the web browser and the web server unit. For example, the web server unit 110 may be an Apache HTTP Server.

The layout of the webpage may use cascading Style Sheets (CSS) or Bootstrap. In an example, the GUI may have an Angular code base whose product is executable within a web browser. Accordingly, it may be visualized on every device providing a browser. The Angular framework may be used to create JavaScript and/or TypeScript code for the webpage.

The calculation sub-unit 130a is configured to compare the colour measurement data to colour reference data to classify the colour measurement data, and to output a result of the comparison via the GUI.

The service-providing unit 120 may be a software, or hardware dedicated to running said software, to provide a service package. For example, the service-providing unit may comprise a session service sub-unit 122 configured to route the user's request to each service provided by a respective sub-unit of the service-providing unit 120. The session service sub-unit 122 may serve as a "proxy server" such that all communications with other sub-units of the service-providing unit 120, including e.g., authentication service sub-unit, is routed via the session service sub-unit 122. The communications between the web browser of client device 10 and the session service sub-unit 122 may be achieved using web sockets, whereas the communications between the session service sub-unit 122 and other sub-units of the service-providing unit 120 may be achieved using HTTP/HTTPs. The session service sub-unit 122 may store session data. The session service sub-unit 122 may be multithreaded, i.e. a threadpool for processing multiple client requests.

The calculation sub-unit 130a may be a software, or hardware dedicated to running said software, configured to calculate the outstanding difference between the reference colour and the measured colour e.g., of the paint coating of a car. The result is reported to the session service sub-unit 122, and communicated to the web browser of the client device 10.

In an example, the calculation sub-unit 130a may be provided in a tool box 130 that stores a plurality of function units (FUs).

Accordingly, the colour quality control server 100 is configured to provide colour quality control in dependent on device and platform. The colour quality control server 100 may thus provide a software that does not need to be installed before usage.

Optionally, the web server unit 110 may be further configured to interface with the user via the webpage and/or the application program to allow the user to define a tolerance level for classifying the colour measurement data. This additional input may be used to classify the sample.

Optionally, the service-providing unit 120 may further comprise an authentication sub-unit 124 configured to be an interface through which the user can authenticate to access a user-requested service. The authentication sub-unit 124 may determine whether the user is authorized to access a function unit, e.g., calculation sub-unit, of the tool box 130 to obtain the requested service using an authorization service. Verifying that the user is authorized to call the tool box 130 may include verifying a user credential received with the call to the function units of the tool box 130 against a known user credential database. For example, the authorization service may compare a received user credential against known user credentials to determine a match. The user credential may be a username and an associated password, an authentication token, a license key, or another suitable authentication credential.

If it is determined that the user is not authorized to call the function unit, e.g., the calculation sub-unit, of the tool box, an error message is returned to the client device.

If, however, it is determined that the user is authorized to call the function unit, e.g., calculation unit, the user's request is routed from the session server to a function unit of the tool box 130 to process the request.

Optionally, the service-providing unit 120 may further comprise a device configuration sub-unit 130b configured to access a configuration database that stores configuration data of one or more colour measurement devices. The device configuration sub-unit 130b may be configured to provide the configuration data to at least one colour measurement device selected by the user for performing colour measurement. The device configuration sub-unit 130 may be a further function unit in the tool box 130. In an example, the configuration database may be stored centrally in a data storage of the service-providing unit. In an example, the configuration database may be stored in a cloud data storage. Accordingly, the user may access the measurement device without installing any driver.

The service-providing unit 120 further comprises a data measurement sub-unit 130c configured to allow the user to access and to trigger, via the webpage and/or the application program, a colour measurement device to perform colour measurement. For example, the communications between the web browser and the measurement device may be achieved using HTTP/HTTPs. The measurement device may start using the configuration file generated by the web browser. The communications between the measurement device and the session service sub-unit 122 may be based on Web socket. Accordingly, the user may access measurement devices triggered by the user directly from the browser. An interface may also be provided for robotic usage.

The colour measurement device also comprises a Universal Serial Bus (USB) device. The colour quality control server is further configured to interact with the USB device with a WebUSB application programming interface (API). The user may perform the USB measurement using e.g. Firefox, Google Chrome or Opera, if the user has rights to access the USB device. Accordingly, Byte Streams may be obtained for selected measurement device with a USB connection from the tool box 130. It is also possible to asynchronously send data to the tool box 130 for delivering the user-requested service.

Thanks to the mobile measurement, the assessment and classification of the measured sample may be accessed directly—even from a remote location. It is not necessary to firstly download the measurement to a Windows-based device.

Optionally, the service-providing unit 120 may further comprise a reference data interface configured to access a reference database that stores the colour reference data for providing the colour reference data to the calculation sub-unit. Optionally, the service-providing unit 120 may further comprise a measurement data interface configured to access a measurement database that stores the colour measurement data for providing the colour measurement data to the calculation sub-unit. Optionally, the service-providing unit 120 may further comprise a data storage configured to store at least one reference of an entry in the configuration database, in the measurement database, and in the reference database per user.

Accordingly, it may be guaranteed that identical standards are applied to data independent of the user's environment.

Optionally, the service-providing unit 120 may further comprise a user data service sub-unit 126 configured to store session information. The user data service sub-unit 126 may enable the user to resume a session on other measurement devices. Any update to the user's GUI may be reported by the session service sub-unit 122 to the user data service sub-unit 126. If the user wishes to restore session, session service sub-unit 122 may request data from the user data service sub-unit 126.

A client device 10, such as a smart phone 10a, personal computer 10b, tablet computer 10c, laptop computer 10d, or other similar computing device, may be utilized by the user to access the colour quality control server 100.

A colour measurement device 20 (shown in FIG. 2), such as a photospectrometer, robot-controlled measurement device, or other similar colour measurement devices, may be used to perform colour measurement.

Optionally, the colour quality control system 200 may further comprise a cloud storage (not shown) configured to store at least one of the configuration database, the measurement database, and the reference database. In this way, the colour quality control system may support decentral storage of data.

Figure 2:
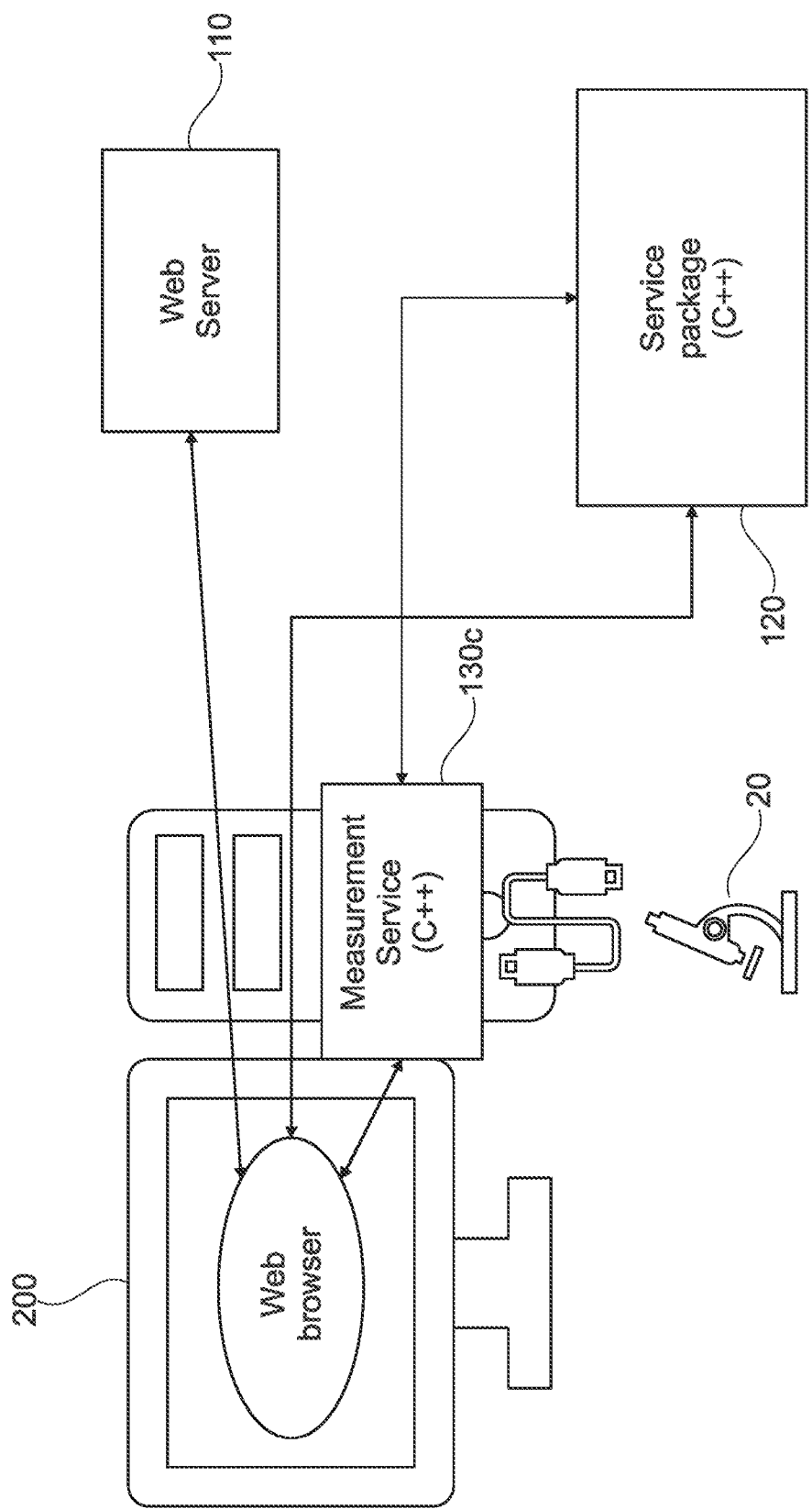
FIG. 2 schematically shows a colour quality control system according to some other embodiments of the present disclosure.

FIG. 2 schematically shows a colour quality control system 200 according to some other embodiments of the present disclosure. In this example, the colour quality control system 200 is implemented in a client device, such as a personal computer as illustrated in FIG. 2. In other words, all services may be provided locally without the need to communicate with a remote server. In this example, the communications between the sub-units of the service-providing unit may be achieved using Inter-process communication (IPC) instead of HTTP/HTTPs as shown in FIG. 1.

A client, such as "localMeasurement.exe", may be installed on the client device. The user may click "startLocalMeasurement" to start the workflow performed by the client. An example of the workflow is as follows:

Start the web server unit on http://localhost:1234.

Web browser requests data via HTTP from the web server unit.

Is the measurement done?

send result.

Measurement data is directly sent to the measurement database. The measurement data may also be sent to the web browser and then sent to the measurement database.

In other examples, the present disclosure may be implemented on cloud computing that supports decentral processing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

The cloud computing may comprise at least one of the following characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Figure 3:
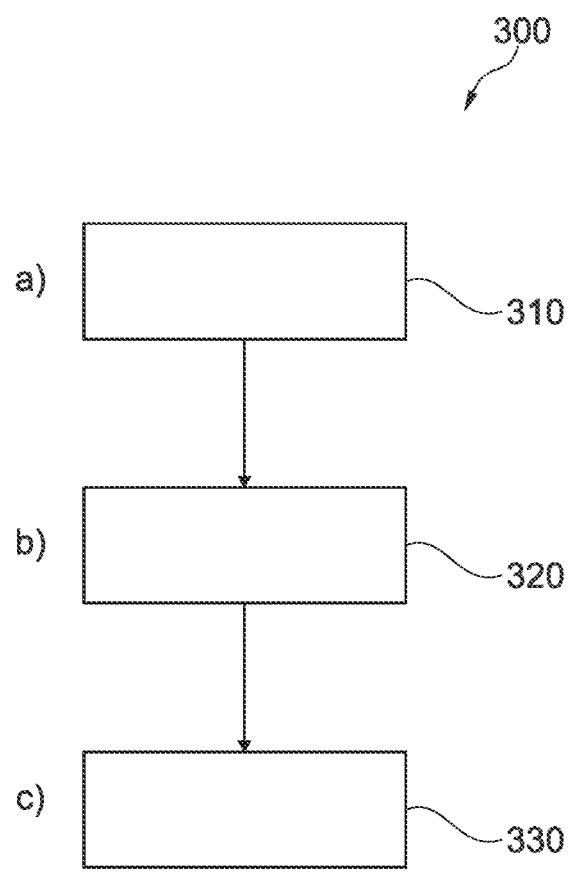
FIG. 3 shows a flow chart illustrating a colour quality control method according to some embodiments of the present disclosure.

FIG. 3 shows a flow chart illustrating a colour quality control method 300 according to some embodiments of the present disclosure. In step 310, i.e. step a), colour measurement data is provided to a colour quality control server as described above, via a graphical user interface (GUI) provided by a webpage and/or an application program on a client device. The client device is connectable to a colour measurement device, which is accessed and triggered, via the webpage and/or the application program, for obtaining the colour measurement data. The colour measurement device is a USB device. The colour quality control server interacts with the USB device with a WebUSB API.

Optionally, step 310 may further comprise the step of interfacing with the client device via the webpage and/or the application program by the web server unit to allow a user to access a colour measurement device and to trigger, via the webpage and/or the application program, the colour measurement device to perform colour measurement.

In step 320, i.e. step b), the colour measurement data is compared to colour reference data to classify the colour measurement data by the colour quality control server.

In step 330, i.e. step c) a result of the comparison is provided, by the colour quality control server, via the GUI to a user.

Figure 4:
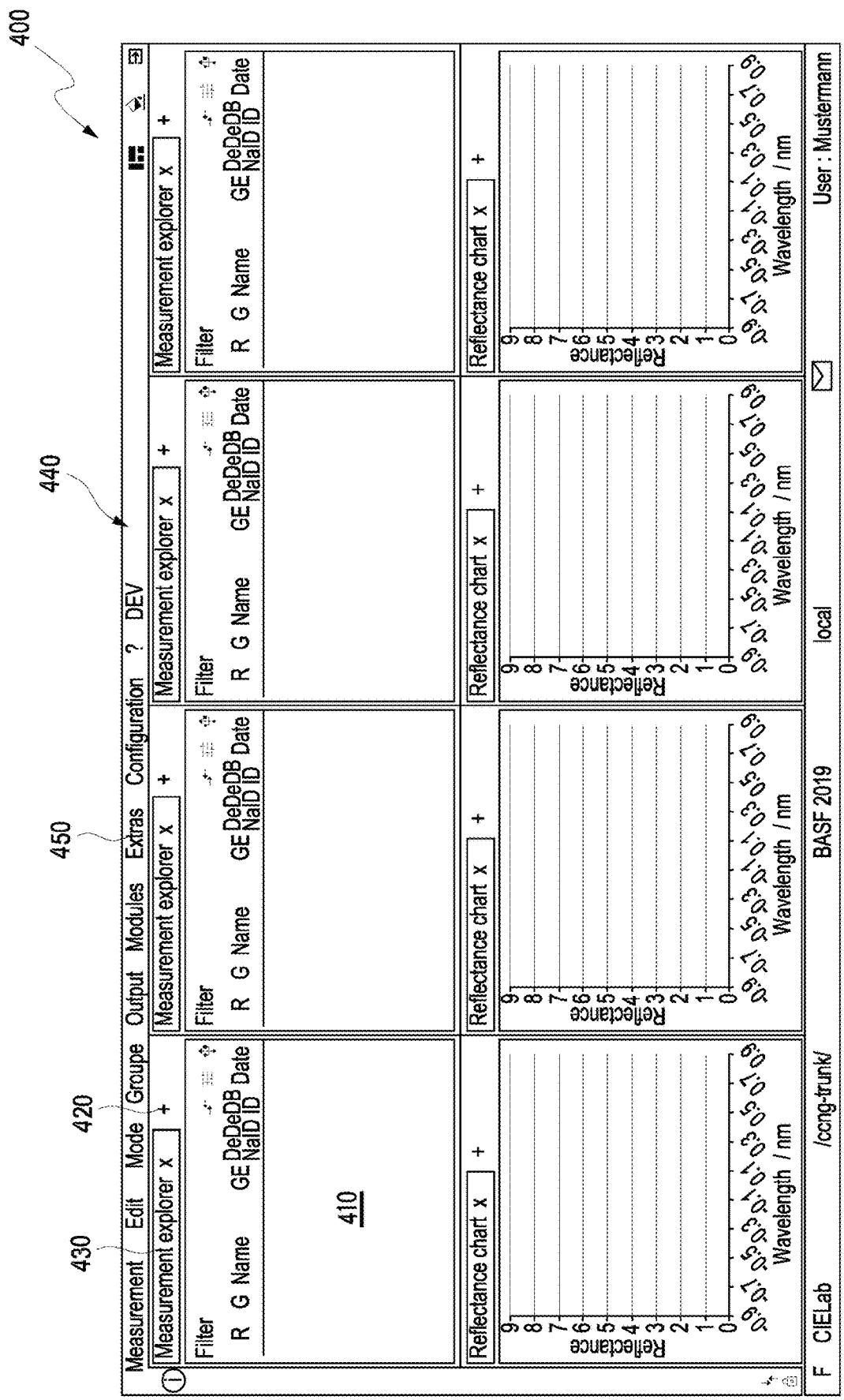
FIG. 4 shows an example screenshot of a GUI provided by a webpage or application program on a client device.

FIG. 4 illustrates an example screenshot of a GUI 400 provided by a webpage or application program on a client device, such as a mobile device. The GUI comprises multiple subareas 410, in which assigned data objects are displayed. A link button 420 is provided in each subarea 410 for selecting the data object to be displayed in the subarea 410. In the example shown in FIG. 4, an indicator 430 of the type of the data object assigned and displayed is provided in the subarea 410.

A quick start button bar 440 comprising multiple buttons 450 for activating different functions is positioned at the upper edge of the GUI. In the example shown in FIG. 4, the GUI comprises eight subareas arranged in four columns. While in this example, all subareas are commensurate, this is not mandatory. Also, the number of subareas may vary per row and/or column.

In operation, the user may connect a colour measurement device to the client device (e.g. mobile phone, laptop, or PDA). The user may then access and trigger the colour measurement device for performing colour measurements by activating the measurement function via the quick start button bar 440. The WebUSB interface provided by the web browser or the application program may be used to control the colour measurement device. Thus, it is possible to carry out a colour measurement with the selected colour measurement device without prior installation or downloading of a "local module" required to control the colour measurement device. The use of WebUSB is also independent of operating systems.

Further, the user may also access (web-)services to obtain the assessment and classification of the measured data through the GUI even from a remote location. For example, the user may use the link button 420 in each subarea 410 for selecting the data object (e.g. the assessment and classification of the measured sample) to be displayed in the subarea 410.

It will be appreciated that the above operation may be performed in any suitable order, e.g., consecutively, simultaneously, or a combination thereof, subject to, where applicable, a particular order being necessitated, e.g., by input/output relations.

Depending on the specific application and the information to be examined by the user, a multitude of different and varying data objects may need to be displayed. There may be a need to provide a computer-implemented method allowing a user to configure a GUI layout with a maximum of flexibility for a maximum of usability.

Figure 5:
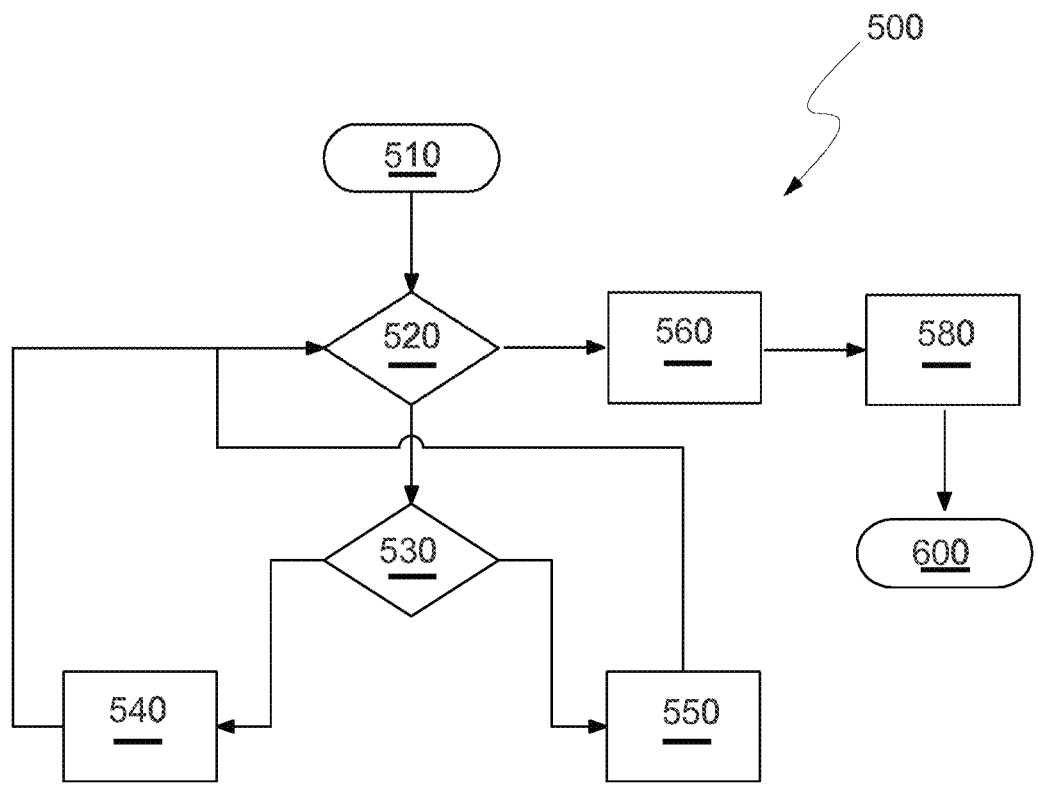
FIG. 5 shows a flowchart illustrating an exemplary method for generating customizable GUI layouts.

Towards this end, FIG. 5 illustrates a flow chart 500 illustrating some of the steps of the method for generating customizable graphical user interface (GUI) layouts for a dashboard software product.

In the context of the present disclosure, a dashboard software product is software which needs to display and control a multitude of different and varying data objects. Examples include trading software applications, e.g., for trading stocks, bonds, options, currencies, goods etc.; software applications in the health sector for monitoring a plurality of vital parameters of a patient like pulse rate, blood pressure, breathing frequency, oxygen saturation, heart rhythm, brain waves etc.; and tools for testing and/or monitoring machines; e.g., engines, which monitor and/or control exhaust parameters, pressure, liquid flow, gas flow, voltages, currents, power, torque, temperature, rotational speed etc. In a particular example, the dashboard software is a colorimetry software product.

After start 510, it is checked in step 520 whether or not there is an input from the user (via e.g. a keyboard, a computer mouse, a trackball, or a touchscreen) indicating that the procedure has been completed. If such an input is detected, the process then moves to step 560.

Otherwise, on detection of further input, e.g., a mouse-click, a check 530 is performed, whether the user selects an available (sub)area on a display associated with the GUI and whether the (sub)area is to be divided horizontally or vertically.

In an example, the (sub)area may be selected by navigating a cursor into the (sub)area. In a particular example of using a computer mouse or a trackball as an input device, a pointer may be moved into the (sub)area to select it. In another particular example of using a touchscreen as an input device, the (sub)area may be selected by touching the touchscreen in the respective (sub)area.

In an example, the selection of vertical or horizontal division may made by navigating a cursor into the (sub)area using a computer mouse (or a trackball), and performing a left mouse-click to select horizontal division of the (sub)area or a right mouse-click to select vertical division of the (sub)area. In the example of FIG. 5, on detection of a right mouse-click, the (sub)area may be divided vertically 540, while on detection of a left mouse-click, the (sub)area may be divided horizontally 550.

In another example (not shown), the selection of vertical or horizontal division may be made by navigating a cursor into the (sub)area using a computer mouse (or a trackball), and performing a right mouse-click to select horizontal division of the (sub)area or a left mouse-click to select vertical division of the (sub)area.

The process then moves back to step 520 to repeat the procedure until a desired grid for the GUI has been obtained. This allows for the generation of a flexible GUI using a recursive algorithm. Said algorithm allows the user to vertically and/or horizontally divide the GUI as desired, making it possible to divide a display area into an arbitrarily clustered amount of subareas to position arbitrary subwindows (e.g. charts, tables, etc.) within these subareas. A click inserts a subarea which in turn offers the possibility to place two new subareas, and so on. As long as the user continues clicking (left/right), further subareas are created. The final grid is comprised of a plurality of rectangular subareas.

The grid of the GUI may be supposed to be as flexible as possible and its generation requires minimal input from the user; the only information required being: start, divide horizontal/vertical, finish.

In one example of the method, the boundaries of each subarea of the obtained grid may be moved to modify the grid, i.e., the subareas of the (finished) grid are modifiable in width and length. In a particular example, a boundary of a subarea may be moved using a computer mouse (or a trackball) by pointing and clicking on the boundary to select it and then dragging the pointer to the desired position.

After having obtained the desired grid or having received an input indicating that the procedure has been completed, each subarea of the grid obtained is assigned to at least one data object provided by the dashboard software in step 560. Once the grid generation has been completed, all subareas can be used to place data objects. Each and every subarea has a bidirectional information mechanism (having n+1 members in its chain, where n is the depth of the respective subarea) which enables the developer to bundle all information about all subareas in one place and—on the other hand—send information to each of the subareas from any desired location. In one example, an input button may be provided in each subarea of the grid for the selection of the at least one data object to be assigned to and displayed in the respective subarea. A single subarea can be assigned to and display more than one data object. Likewise, a single data object can be assigned to and displayed in more than one subarea.

The data objects may be selected from the group consisting of numbers, text, symbols, tables, diagrams, and pictures. In a further example, the data objects may represent measured data obtained by the dashboard software, e.g., a colorimetry software product.

In an example, an assigned data object can be freely moved from one subarea to another subarea, e.g., by drag-and-drop. In a further example, wherein a single subarea is assigned to more than one data object, the order of the data objects displayed in the respective subarea can be altered at will, e.g., by a drag-and-drop mechanism, which moves the respective data object to a different position in the list of data objects assigned to the respective subarea.

In an example, the finished gird may be persistent, i.e., it may be transferred to another GUI or be reloaded.

In an example, the method may further involves grouping at least two of the subareas, and highlighting the group of subareas with a common colour.

In an example, the GUI may comprise, in addition to the grid of subareas, a quick start button bar which can get pinned at an arbitrary position at an edge of the display. In a particular example, the quick start button bar may also float in and float out from the position when it's not pinned. In a further example, buttons activating different functions may be added and removed to the quick start button bar via drag and drop.

In an example, the GUI may include a standard header, a standard footer, and the two main components in terms of flexibility, i.e., a quick start button bar and a custom grid which includes views like charts, tables and reports (etc.). The grid meets the need to design arbitrary rectangular subareas where different views can be positioned, the size of the subareas being customizable. FIG. 4 shows an example of the flexible GUI generated with the method of FIG. 5

After step 560, the data objects are displayed in step 580 in the assigned subareas. The at least one display may comprise a touchscreen. The touchscreen also acts as an input device.

The process is then ended in step 600.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A colour quality control server (100) for mobile colour quality control of paint coating, comprising:
a web server unit (110); and
a service-providing unit (120) comprising a calculation sub-unit (130*a*) and a data measurement sub-unit (130*c*);
wherein the web server unit is configured to interface with a client device via a webpage and/or an application program served by the web server unit, and to provide a graphical user interface (GUI) to the client device by the webpage and/or application program such that colour measurement data of paint coating is provided, via the webpage and/or application program on the client device, to the service-providing unit;
wherein the data measurement sub-unit is configured to facilitate communications between the colour quality control server and a colour measurement device connected to the client device without prior installation or downloading of a local driver on the client device to control the colour measurement device, thereby enabling a user to activate a measurement function within the webpage and/or application program on the client device to trigger the colour measurement device connected to the client device to perform a colour measurement of the paint coating and provide the colour measurement of the paint coating to the service-providing unit, said colour measurement device being a Universal Serial Bus-US B, Bus (USB) device,
wherein the calculation sub-unit is configured to compare the colour measurement data of the paint coating to colour reference data to classify the colour measurement data of the paint coating, and to output a result of the comparison via the GUI, and
wherein the colour quality control server is configured to interact with the colour measurement device with a WebUSB application programming interface (API).

2. The colour quality control server according to claim 1, wherein the web server unit is further configured to interface with the client device via the webpage and/or the application program to allow the user to define a tolerance level for classifying the colour measurement data.

3. The colour quality control server according to claim 1, wherein the service-providing unit further comprises a device configuration sub-unit (130*b*) configured to access a configuration database that stores configuration data of one or more colour measurement devices; and
wherein the device configuration sub-unit is further configured to provide the configuration data to at least one colour measurement device selected by the user for performing a colour measurement.

4. The colour quality control server according to claim 1, wherein the service-providing unit further comprises a reference data interface configured to access a reference database that stores the colour reference data for providing the colour reference data to the calculation sub-unit.

5. The colour quality control server according to claim 1, wherein the service-providing unit further comprises a measurement data interface configured to access a measurement database that stores the colour measurement data of paint coating for providing the colour measurement data to the calculation sub-unit.

6. The colour quality control server according to claim 1, further comprising:
a data storage configured to store at least one reference of an entry in the configuration database, in the measurement database, and in the reference database per user.

7. The colour quality control server according to claim 1, wherein the GUI has an Angular code base whose product is executable within a web browser.

8. The colour quality control server according to claim 1, wherein the service-providing unit further comprises an authentication sub-unit (124) configured to be an interface through which the user can authenticate to access a user-requested service.

9. A colour quality control system (200) for mobile colour quality control of paint coating, comprising:
a colour measurement device (20);
a client device (10); and
a colour quality control server (100) according to claim 1; and
wherein the colour measurement device is configured to perform a colour measurement,
wherein the client device is configured to communicate with the colour quality control server to provide a graphical user interface, GUI, to a client device by a webpage and/or an application program served by the colour quality control server such that the colour measurement data of paint coating is classified via the webpage and/or the application program.

10. The colour quality control system according to claim 9, further comprising
a cloud storage configured to store at least one of the configuration database, the measurement database, and the reference database.

11. A colour quality control method (300) for mobile colour quality control of paint coating, comprising:
a) providing (310), via a graphical user interface, GUI, provided by a webpage and/or an application program on a client device, colour measurement data of paint coating to a colour quality control server according to claim 1;
b) comparing (320), by the colour quality control server, the colour measurement data to colour reference data of paint coating to classify the colour measurement data; and
c) providing (330), by the colour quality control server via the GUI, a result of the comparison,
wherein the client device is connected to a colour measurement device, which is accessed and triggered, via the webpage and/or the application program on the client device, for obtaining the colour measurement data, said colour measurement device being a Universal Serial Bus, USB, device, and
wherein the colour quality control server interacts with the colour measurement device with a WebUSB application programming interface, API,
wherein step a) further comprises:
interfacing with the client device via the webpage and/or the application program by the web server unit to allow a user to access a colour measurement device and to trigger, via the webpage and/or the application program on the client device, the colour measurement device to perform colour measurement without prior installation or downloading of a local module on the client device required to control the colour measurement device and assess the colour measurement data.

12. A computer program product comprising a computer program with program code for performing the method according to claim 11.

\* \* \* \* \*